US009787891B2

(12) United States Patent
Kamiya et al.

(10) Patent No.: US 9,787,891 B2
(45) Date of Patent: Oct. 10, 2017

(54) FOCUS CONTROL APPARATUS AND FOCUS CONTROL METHOD

(71) Applicant: Sony Corporation, Minato-ku (JP)

(72) Inventors: Koji Kamiya, Kanagawa (JP); Hiroaki Matsumura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 169 days.

(21) Appl. No.: 14/534,389

(22) Filed: Nov. 6, 2014

(65) Prior Publication Data
US 2015/0168809 A1 Jun. 18, 2015

(30) Foreign Application Priority Data

Dec. 13, 2013 (JP) ................................. 2013-257770

(51) Int. Cl.
*H04N 5/232* (2006.01)
*G03B 13/16* (2006.01)
*G03B 13/36* (2006.01)
*G03B 13/24* (2006.01)

(52) U.S. Cl.
CPC ......... *H04N 5/23216* (2013.01); *G03B 13/16* (2013.01); *G03B 13/36* (2013.01); *H04N 5/23203* (2013.01); *H04N 5/23209* (2013.01); *H04N 5/23212* (2013.01); *H04N 5/23293* (2013.01); *G03B 13/24* (2013.01)

(58) Field of Classification Search
CPC .. H04N 5/2259; H04N 5/232; H04N 5/23216; G09G 2320/068
USPC .......................... 348/211.3, 211.7, 211.9, 345
See application file for complete search history.

(56) References Cited

U.S. PATENT DOCUMENTS

| 5,517,236 | A | * | 5/1996 | Sergeant | G08B 13/19626 348/143 |
|---|---|---|---|---|---|
| 5,568,183 | A | * | 10/1996 | Cortjens | H04N 7/15 348/14.05 |
| 7,750,944 | B2 | * | 7/2010 | Arbogast | G08B 13/196 348/211.7 |
| 8,405,733 | B2 | * | 3/2013 | Saijo | H04N 5/23203 348/211.6 |
| 2005/0036036 | A1 | * | 2/2005 | Stevenson | G08B 13/19608 348/211.99 |

(Continued)

FOREIGN PATENT DOCUMENTS

| JP | 4-367175 | 12/1992 |
| JP | 5-236316 | 9/1993 |
| JP | 2770451 | 4/1998 |

(Continued)

OTHER PUBLICATIONS

U.S. Appl. No. 14/585,719, filed Dec. 30, 2014, Kamiya.
Office Action dated May 23, 2017, in Japanese Patent Application No. 2013-257710.

*Primary Examiner* — Lin Ye
*Assistant Examiner* — Chriss Yoder, III
(74) *Attorney, Agent, or Firm* — Oblon, McClelland, Maier & Neustadt, L.L.P.

(57) ABSTRACT

There is provided a focus control apparatus including: an information acquisition unit that acquires focal distance information of a predetermined position on a 2-dimensional map using the 2-dimensional map of focal distances; and a focus control unit that performs focus control based on the focal distance information which is acquired by the information acquisition unit.

10 Claims, 6 Drawing Sheets

(56) References Cited

U.S. PATENT DOCUMENTS

2008/0074531 A1* 3/2008 Ide .......................... G03B 3/00
                                                          348/346

FOREIGN PATENT DOCUMENTS

| JP | 2012-120314 | 7/2012 |
| JP | 2012-244411 | 12/2012 |

* cited by examiner

FOCUS CONTROL APPARATUS AND FOCUS CONTROL METHOD

CROSS REFERENCE TO RELATED APPLICATIONS

This application claims the benefit of Japanese Priority Patent Application JP 2013-257770 filed Dec. 13, 2013, the entire contents of which are incorporated herein by reference.

BACKGROUND

The present disclosure relates to a focus control apparatus and a focus control method.

In the related art, a 4 K high-definition camera has been known (for example, refer to Japanese Unexamined Patent Application Publication No. 2012-244411). Further, in the related art, an operational method of imaging an image with the 4 K high-definition camera, cutting out a part of the imaged image, and extracting an HD zoom image has been considered. At this time, in the high-definition camera, imaging is performed such that the entire image is photographed at a slightly wide angle of a fixed image frame. When the image is photographed at the wide angle, the depth of the field of the focus becomes high, and it is expected that an entire screen is focused.

However, in the 4 K high-definition camera, for example, an imaging element, which is called a 35 mm sensor having a large imaging surface, and a 35 mm lens are used in many cases, and there is a tendency for the depth of the field to be low. Therefore, even when imaging is performed at a wide angle, it is difficult to acquire an image, which is being focused sharply, due to the difference in focal distances at a position where a front-side image is reflected and a position where a back-side image is reflected. Therefore, an image which varies in focus is cut out according to a position to be cut out.

SUMMARY

It is desirable to enable easy acquisition of an image in a predetermined focus state.

According to an embodiment of the present disclosure, there is provided a focus control apparatus including: an information acquisition unit that acquires focal distance information of a predetermined position on a 2-dimensional map using the 2-dimensional map of focal distances; and a focus control unit that performs focus control based on the focal distance information which is acquired by the information acquisition unit.

According to the embodiment of the present disclosure, the focal distance information of the predetermined position on the 2-dimensional map is acquired by the information acquisition unit using the 2-dimensional map of the focal distances. Further, the focus control is performed based on the focal distance information, which is acquired by the information acquisition unit, by the focus control unit. For example, the focus control apparatus may further include a mode setting unit which sets the mode to an automatic focus control mode. When the mode is set to the automatic focus control mode, the focus control unit may perform the focus control based on the focal distance information which is acquired by the information acquisition unit.

For example, the 2-dimensional map of the focal distances may include focal distance information of a plurality of positions on an imaging screen, and the information acquisition unit may acquire the focal distance information corresponding to a cut-out position, which is set on the imaging screen, using the 2-dimensional map. Further, in this case, for example, the focus control apparatus may further include a map generation unit that generates the 2-dimensional map based on the focal distances of the plurality of positions on the imaging screen.

In addition, for example, the 2-dimensional map of the focal distances may include the focal distance information of a plurality of camera positions within an imaging range, and the information acquisition unit may acquire the focal distance information corresponding to a current camera position using the 2-dimensional map. Further, in this case, for example, the focus control apparatus may further include a map generation unit that generates the 2-dimensional map based on the focal distances of the plurality of camera positions. In addition, in this case, current camera position information may be sent to the information acquisition unit from a potentiometer included in a tripod to which a camera apparatus is fixed.

According to the embodiment of the present disclosure, the focus control is performed based on the focal distance information which is acquired from the 2-dimensional map of the focal distances, and an image in a predetermined focus state is easily acquired. For example, it is possible to easily acquire the image in the predetermined focus state as an image which is cut out in an arbitrary position or an image which is imaged at an arbitrary camera position in which a user does not perform a focus adjustment operation.

Meanwhile, according to the embodiment of the present disclosure, for example, the focus control apparatus may further include an additional adjustment unit that performs additional adjustment on the focal distance with regard to the focal distance information which is acquired by the information acquisition unit, and the focus control unit may perform the focus control based on the focal distance information which is adjusted by the additional adjustment unit. As described above, since it is possible to perform the additional adjustment on the focal distance, it is possible to adaptively manage the change in the imaged image.

In addition, according to the embodiment of the present disclosure, for example, the focus control apparatus may further include an additional quantity control unit that significantly reduces an absolute value of the quantity of addition of the focal distance which is added by the additional adjustment unit as the quantity of movement of the predetermined position on the 2-dimensional map is large. Therefore, in a position acquired after change, it is possible to reduce influence of the quantity of addition according to the position acquired before change, and thus it is possible to approach an original focus control based on the 2-dimensional map.

According to the embodiment of the present disclosure, it is possible to easily acquire an image in a predetermined focus state. Meanwhile, the advantages disclosed in the specification are merely examples and are not limited. In addition, additional advantages may be provided.

DETAILED DESCRIPTION OF EMBODIMENTS

Figure 1:
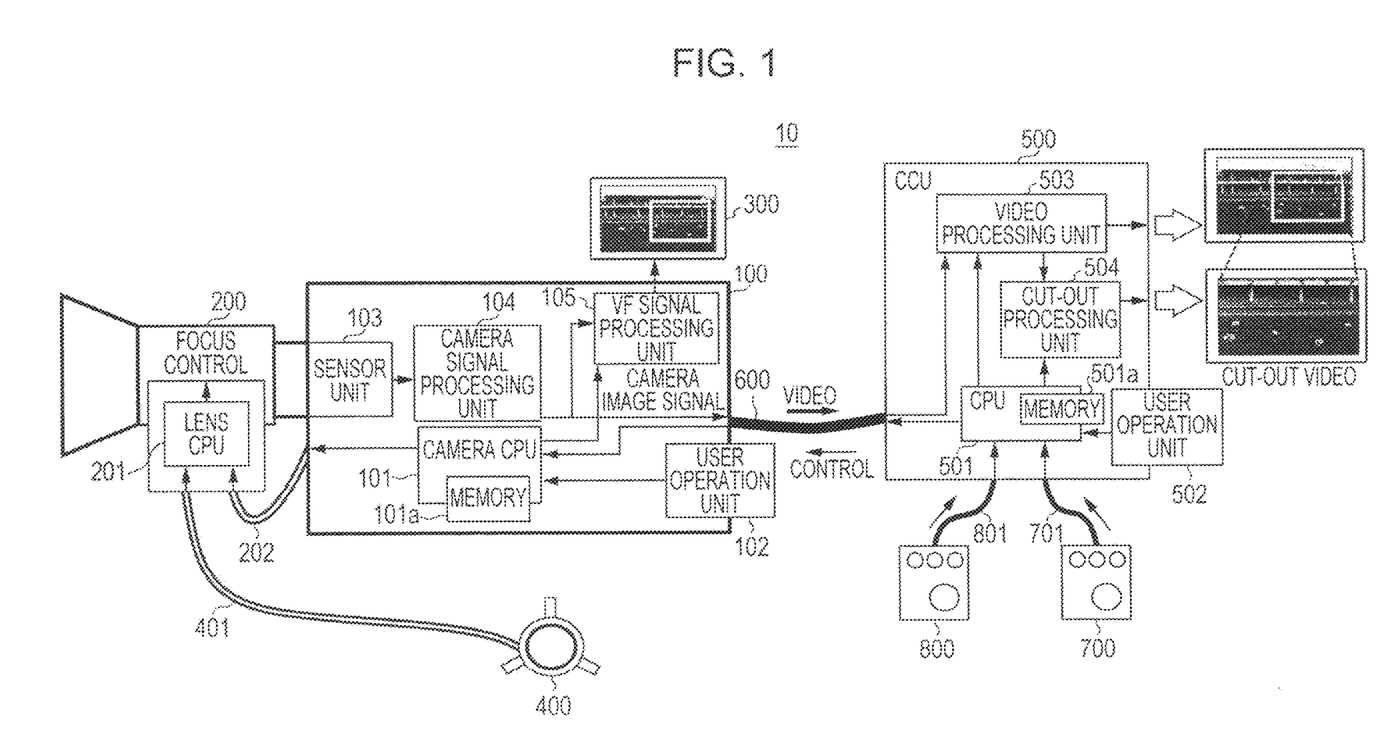
FIG. 1 is a block diagram illustrating an example of the configuration of a camera system according to a first embodiment.

Hereinafter, modes for carrying out the present disclosure (hereinafter, referred to as "embodiment") will be described. Meanwhile, description will be made in the following order.
1. First Embodiment
2. Second Embodiment
3. Modification Example 1. First Embodiment Example of Configuration of Camera System FIG. 1 illustrates an example of the configuration of a camera system 10 according to a first embodiment. The camera system 10 is configured such that a Camera Control Unit (CCU) 500 is connected to the camera apparatus 100 through a cable 600.

A lens apparatus 200 and a view finder 300 are connected to the camera apparatus 100. The lens apparatus 200 is attached to a lens mounting unit which is in the front part of the camera apparatus 100. The lens apparatus 200 is capable of adjusting the focus through a focus demand (focus controller) 400 and is capable of adjusting the focus through a following focus controller from the side of the CCU 500.

The lens apparatus 200 includes a lens CPU 201 which controls the operation of each of the units of the lens apparatus 200. The lens CPU 201 performs focus control based on a focus adjustment signal, which is transmitted from the focus demand 400 through a cable 401 or a focus adjustment signal which is transmitted from the camera apparatus 100 through a cable 202.

The camera apparatus 100 includes a camera CPU 101, a user operation unit 102, a sensor unit 103, a camera signal processing unit 104, and a VF signal processing unit 105. The camera CPU 101 controls the operation of each of the units of the camera apparatus 100. In addition, the camera CPU 101 performs communication of a necessary signal to the lens CPU 201 of the lens apparatus 200 or to the CPU 501 of the CCU 500. The user operation unit 102 is connected to the camera CPU 101, and forms a user interface such that a user can perform various operations.

The sensor unit 103 includes, for example, a 4 K or 8 K high-definition (high-resolution) image sensor or the like, and outputs a high-definition imaged image signal corresponding to a subject. The subject is focused on an imaging surface of the image sensor by the above-described lens apparatus 200. The camera signal processing unit 104 processes the imaged image signal which is output from the sensor unit 103, and outputs an image signal (camera picture signal) as the output of the camera apparatus 100. The camera signal processing unit 104 performs, for example, processes such as gain control, white balance adjustment, and gamma correction.

The VF signal processing unit 105 generates, for example, an HD-resolution image signal for the view finder based on the image signal which is output from the camera signal processing unit 104, and transmits the image signal to the view finder 300. The VF signal processing unit 105 generates, for example, a display signal, such as a rectangular frame display signal indicative of a cut-out position (area) in the CCU 500, based on the display control signal which is transmitted from the camera CPU 101. Further, the VF signal processing unit 105 synthesizes the display signal with the image signal (imaged image signal) which is output from the camera signal processing unit 104, and generates the image signal for the view finder.

The CCU 500 includes the CPU 501, a user operation unit 502, a video processing unit 503, and a cut-out processing unit 504. The CPU 501 controls the operation of each of the units of the CCU 500. In addition, the CPU 501 performs communication of a necessary signal to the camera CPU 101 of the camera apparatus 100. The user operation unit 502 is connected to the CPU 501, and forms a user interface such that the user can perform various operations.

The video processing unit 503 processes, for example, a 4 K or 8 K high-definition image signal which is transmitted from the camera apparatus 100 through the cable 600, and outputs the high-definition image signal acquired after performing the process. The cut-out processing unit 504 extracts a HD resolution image signal in the cut-out position (area) from the high-definition image signal acquired by the video processing unit 503, and outputs the extracted HD resolution image signal. The cut-out position (area) is instructed to the CPU 501 from a cut-out controller 700 through a cable 701.

The user can change the cut-out position (area) into an arbitrary position by operating the cut-out controller 700. Although not shown in the drawing, for example, an HD resolution image is displayed on the monitor of the CCU 500 in order to recognize the content of the high-definition image signal, and a rectangular frame indicative of the cut-out position (area) is displayed in the image. The user can move the cut-out position (area) to an appropriate position with reference to the display of the rectangular frame.

In addition, a follow focus controller 800 is connected to the CPU 501 through a cable 801. The user can perform focus adjustment in the lens apparatus 200 by operating the follow focus controller 800. In this case, the focus adjustment signal is supplied to the lens CPU 201 of the lens apparatus 200 from the CPU 501 through the camera CPU 101 of the camera apparatus 100.

In the embodiment, in the CCU 500, it is possible to generate the 2-dimensional map for focal distances based on the operation of the user. The 2-dimensional map includes a plurality of positions, for example, pieces of focal distance information between respective pixel positions on an imaging screen. The 2-dimensional map is generated in map data registration mode by, for example, the following procedure. The map data registration mode is set by the operation of the user operation unit 502 performed by the user.

Figure 2A:
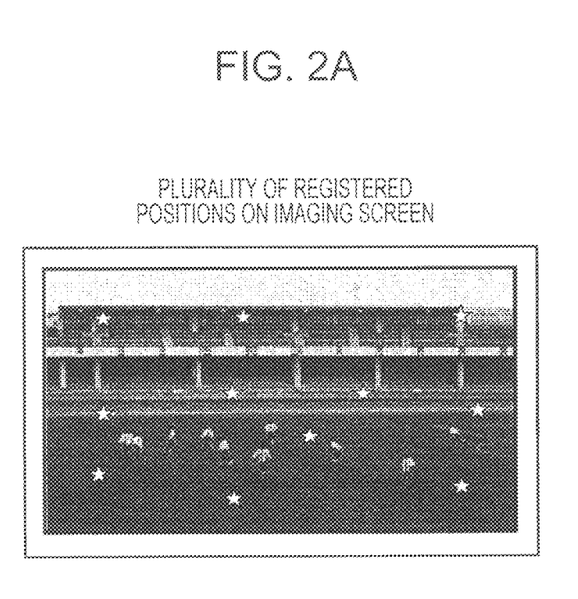
FIGS. 2A and 2B are diagrams illustrating a 2-dimensional map of focal distances, which includes focal distance information of a plurality of positions on an imaging screen.

Initially, the CPU 501 registers pieces of focal distance information for a plurality of registration positions which are selected on the imaging screen based on the operation performed by the user, as shown using stars in FIG. 2A. In this case, the user registers the focal distance information with regard to each of the registration positions by operating the follow focus controller 800. For example, a position where the focal distance is significantly changed is preponderantly selected as the registration position. In addition, the focal distance information to be registered does not necessarily indicate a focal distance which is acquired when a subject is being focused sharply in the registration position, and the focal distance information to be registered may be a focal distance which is desired to be combined when an area, which has a position to be cut out, is cut.

Subsequently, the camera CPU 101 acquires a focal distance corresponding to each of the pixel positions on the imaging screen based on the pieces of positional information of the plurality of registration positions and focal distance information, and completes the 2-dimensional map. In this case, the CPU 501 forms a triangular area which includes the registration position as an apex, as show in FIG. 2B. Further, with regard to each of the pixel positions in the triangular area, the focal distance is acquired according to the distance from three points based on plane approximation using the triangle.

Figure 2B:
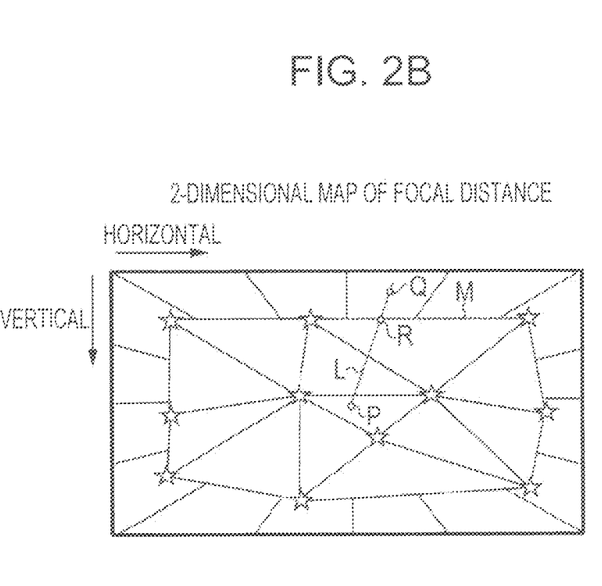

In addition, with regard to each of the pixel positions other than the triangular area, a radiation line which passes from the center of the screen to the pixel position is assumed, and a focal distance of the intersection position of an edge of an outer frame, which crosses the radiation line, is maintained. For example, as shown in FIG. 2B, when it is assumed that the center of the screen is P and a pixel position, the focal distance of which should be acquired, is Q, the focal distance of Q is the same as the focal distance of the point of the intersection position R between a radiation line L, which extends from P to Q, and the edge M of the outer frame, which crosses the radiation line L. Meanwhile, it may be considered to acquire the focal distance Q through extrapolation based on the focal distance of P and the focal distance R.

In addition, the CPU 501 generates the triangular area which includes the registration positions as apexes using an automatic connection. An algorithm of the automatic connection will be described below with reference to FIG. 3. That is, initially, a registration position "1" which is close to the center of the screen and a registration position "2" which is the closest to the registration position "1" are connected by a line 2. Subsequently, a registration position "3", which is the closest to the middle point of the line 2, is selected (when registration positions "3" which are the closest to both sides are found, both registration positions "3" are selected), and the registration position "3" and the registration positions "1" and "2" are connected by lines 3.

Figure 3:
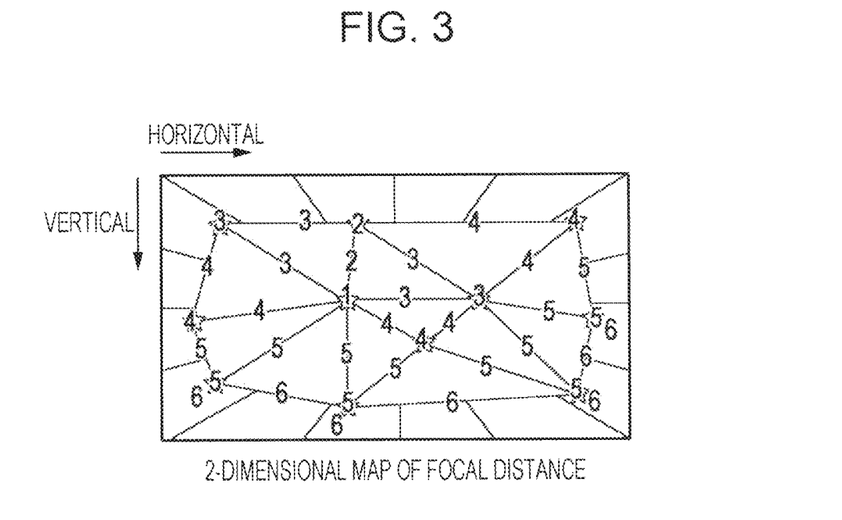
FIG. 3 is a diagram illustrating an automatic connection algorithm in order to automatically connect a triangular area which includes respective registration positions as apexes.

Subsequently, a registration position "4", which does not cross another edge from the middle point of the line 3 and is not connected to registration positions at both ends of the line 3, is selected, the registration position "4" and a portion of registration positions at both the ends of the line 3, which is not connected, are connected by a line 4. Hereinafter, the same process is continued, and the process is ended when there is no closest registration position, which does not cross another edge and is not connected to registration positions at both the ends of the line.

Meanwhile, a configuration may be considered in which the triangular area which includes each of the registration positions as an apex is formed in such a way that the user operates the user operation unit 502 and the CPU 501 performs only a process to acquire the focal distance of each of the pixel positions after the user performs the operation.

The 2-dimensional map of the focal distances, which is generated by the CPU 501 of the CCU 500, as described above is maintained on the side of the CCU 500 by, for example, a memory 501a included in the CPU 501. As described above, the user can change the cut-out position (area) to an arbitrary position by operating the cut-out controller 700.

In the embodiment, the CPU 501 of the CCU 500 can set a mode to an automatic focus control mode based on the operation of the user performed on the user operation unit 502. In a case of the automatic focus control mode, the CPU 501 acquires the focal distance information corresponding to the cut-out position (area) in accordance with the change in the cut-out position (area) based on the 2-dimensional map of the focal distances maintained in the memory 501a. Here, the focal distance information corresponding to the cut-out position (area) means, for example, average focal distance information of the central pixel positions of the cut-out position (area) or a plurality of pixel positions in a predetermined range which includes the central pixel positions, average focal distance information of a preset pixel positions of the cut-out position (area) or a plurality of pixel positions in a predetermined range which includes the pixel positions, or the like.

Further, the CPU 501 transmits the focal distance information corresponding to the cut-out position (area) to the lens CPU 201 of the lens apparatus 200 through the camera CPU 101 of the camera apparatus 100. The lens CPU 201 performs focus control based on the focal distance information transmitted as described above. Therefore, the focus state of the cut-out position (area) is automatically adjusted to a focus state which is registered in the 2-dimensional map in advance.

Meanwhile, in the embodiment, when the mode is the automatic focus control mode and an additional adjustment mode is turned on based on the operation of the user operation unit 502 performed by the user, it is possible to adjust the quantity of addition of the focal distance. In this case, when the follow focus controller 800 is operated by the user, the CPU 501 performs additional adjustment on the focal distance with regard to the focal distance information corresponding to the cut-out position (area) which is acquired based on the 2-dimensional map. Further, the CPU 501 transmits the focal distance information acquired through the additional adjustment to the lens CPU 201 of the lens apparatus 200 through the camera CPU 101 of the camera apparatus 100. Therefore, when the user operates the follow focus controller 800, it is possible to change the focus state according to, for example, the change in the content of the imaged image or the like, from the focus state which is determined using the 2-dimensional map.

As described above, in the camera system 10 shown in FIG. 1, the focal distance information corresponding to the cut-out position (area) is acquired from the 2-dimensional map of the focal distances in the automatic focus control mode and the focus control is automatically performed based on the focal distance information. Therefore, for example, even when the cut-out position (area) is changed, it is possible to automatically acquire the focus state corresponding to the cut-out position (area) acquired after the change of the cut-out position (area), and thus it is possible to reduce the labor of the user for the focus adjustment.

Meanwhile, in the above description, description has been made in which the 2-dimensional map of the focal distances, which is generated by the CCU 500, is maintained on the side of the CCU 500. However, the 2-dimensional map of the focal distances may be maintained on the side of the camera apparatus 100 by, for example, the memory 101a included in the camera CPU 101 of the camera apparatus 100. In this case, cut-out position (area) information is transmitted from the CPU 501 of the CCU 500 to the camera CPU 101 of the camera apparatus 100. Further, a configuration is made such that the camera CPU 101 acquires the focal distance information corresponding to the cut-out position (area) based on the 2-dimensional map of the focal distances, which is maintained in the memory 101a, and the focal distance information is transmitted to the lens CPU 201 of the lens apparatus 200.

In addition, in the above description, description has been made such that the CCU 500 performs the cut-out process. However, it may be considered to include a cut-out processing unit in the camera apparatus 100 that performs the cut-out process. It is possible to apply the present disclosure in the same manner in this case.

2. Second Embodiment

Example of Configuration of Camera System

Figure 4:
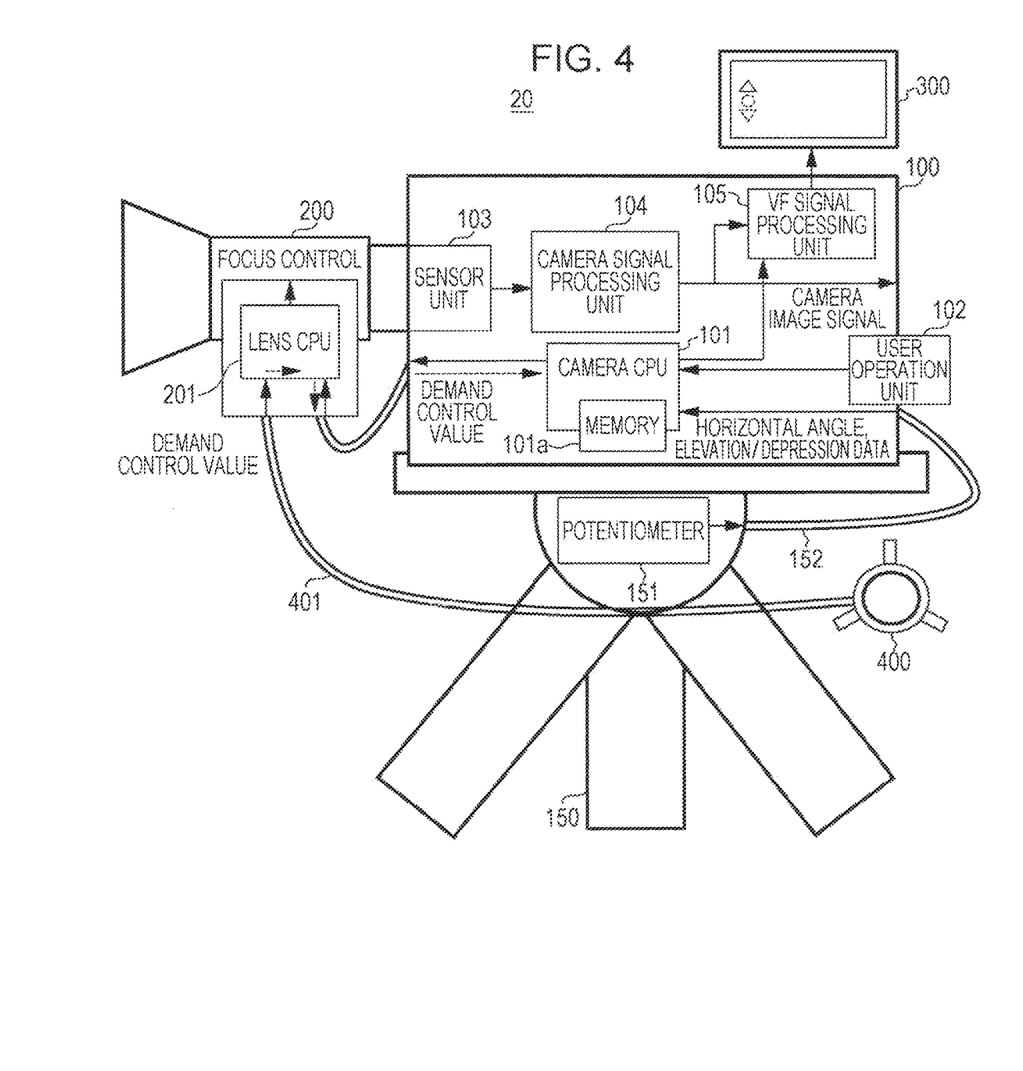
FIG. 4 is a block diagram illustrating an example of the configuration of a camera system according to a second embodiment.

FIG. 4 illustrates an example of the configuration of a camera system 20 according to a second embodiment. In FIG. 4, the same reference symbols are attached to portions corresponding to FIG. 1. The camera system 20 includes a camera apparatus 100, a lens apparatus 200, and a view finder 300. The lens apparatus 200 is attached to a lens mounting unit which is in the front part of the camera apparatus 100.

The lens apparatus 200 includes a lens CPU 201 which controls the operation of each of the units of the lens apparatus 200. The lens CPU 201 performs focus control based on a focus adjustment signal (demand control value), which is transmitted from a focus demand 400 through a cable 401, in a normal mode. In contrast, in a mode in which control is performed by the side of the camera apparatus 100, the lens CPU 201 performs focus control based on focal distance information which is transmitted from the side of the camera apparatus 100. In this case, the focus demand 400 is used in order to perform additional adjustment of the focal distances, and the focus adjustment signal, which is transmitted from the focus demand 400, is transmitted to the side of the camera apparatus 100 through the lens CPU 201 as shown by a broken line.

The camera apparatus 100 includes a camera CPU 101, a user operation unit 102, a sensor unit 103, a camera signal processing unit 104, and a VF signal processing unit 105. The camera CPU 101 controls the operation of each of the units of the camera apparatus 100. In addition, the camera CPU 101 performs communication for a necessary signal with the lens CPU 201 of the lens apparatus 200. The user operation unit 102 is connected to the camera CPU 101, and forms a user interface such that a user can perform various operations.

The sensor unit 103 includes an image sensor and outputs an imaged image signal corresponding to a subject. The subject is focused on an imaging surface of the image sensor by the above-described lens apparatus 200. The camera signal processing unit 104 processes the imaged image signal which is output from the sensor unit 103, and outputs an image signal (camera picture signal) as the output of the camera apparatus 100. The camera signal processing unit 104 performs, for example, processes such as gain control, white balance adjustment, and gamma correction.

The VF signal processing unit 105 generates, for example, an HD-resolution image signal for the view finder based on the image signal which is output from the camera signal processing unit 104, and transmits the image signal to the view finder 300. The VF signal processing unit 105 generates, for example, a display signal, such as a rectangular frame display signal indicative of a cut-out position (area) in a CCU 500, based on the display control signal which is transmitted from the camera CPU 101. Further, the VF signal processing unit 105 synthesizes the display signal with the image signal (imaged image signal) which is output from the camera signal processing unit 104, and generates the image signal for the view finder.

Figure 5A:
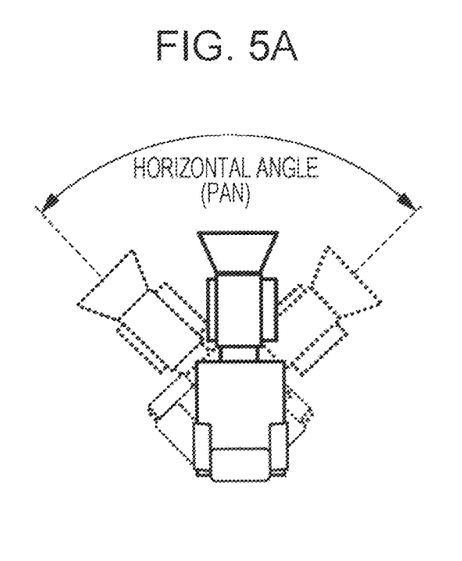
FIGS. 5A and 5B are diagrams illustrating a range of change in camera positions (horizontal angle and elevation/depression angle) using a tripod.
Figure 5B:
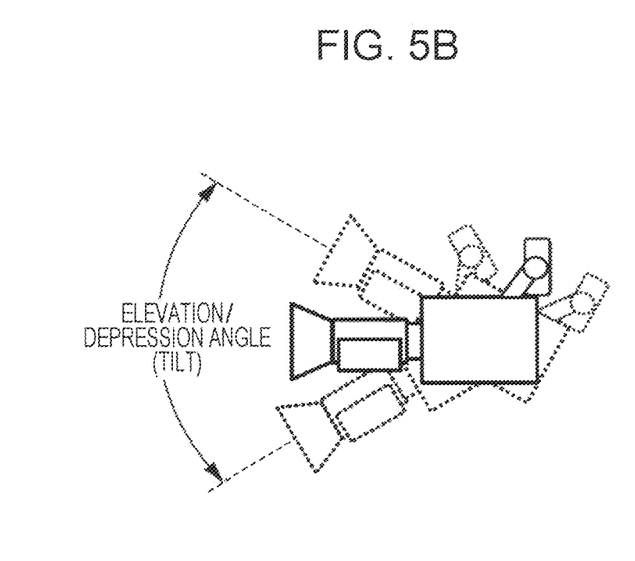

The camera apparatus 100 is fixed to a tripod 150. It is possible to change a camera position, that is, the horizontal angle (pan) and the elevation/depression angle (tilt) of the camera apparatus 100 using the tripod 150. FIG. 5A illustrates an example of a range of change in the horizontal angle using the tripod 150. FIG. 5B illustrates an example of a range of change in the elevation/depression angle using the tripod 150. The range of change in the horizontal angle or the elevation/depression angle is an imaging range of a camera. The tripod 150 includes a potentiometer 151, and transmits camera positional information (the horizontal angle and the elevation/depression angle) to the camera CPU 101 of the camera apparatus 100 through a cable 152.

In the embodiment, the camera CPU 101 can generate a 2-dimensional map of focal distances based on the operation performed by the user. The 2-dimensional map has focal distance information of the plurality of camera positions within the imaging range. The 2-dimensional map is generated in, for example, the following order in a map data registration mode. The map data registration mode is set by the operation of the user operation unit 102 performed by the user.

Figure 6A:
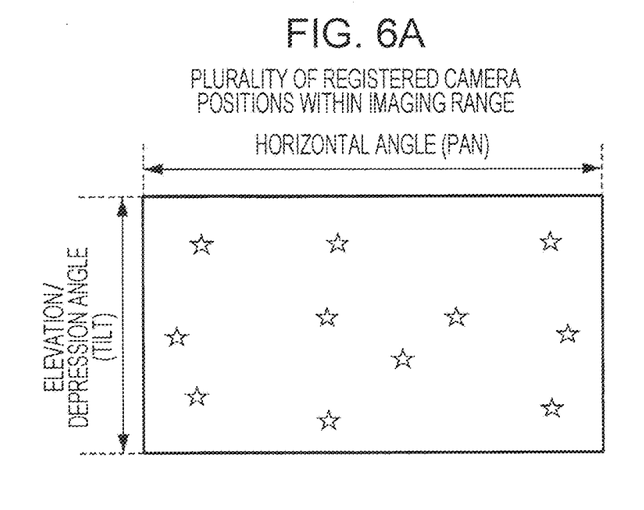
FIGS. 6A and 6B are diagrams illustrating a 2-dimensional map of focal distances, which includes focal distance information of a plurality of camera positions within an imaging range.

Initially, based on the operation performed by the user, the CPU 501 registers the focal distance information with regard to a plurality of registered camera positions which are selected within the imaging range as shown by stars in FIG. 6A. In this case, the user determines a plurality of objects corresponding to the plurality of registered camera positions within the imaging range. For example, objects, in which a focal distance significantly changes, are preponderantly selected as the objects.

The user registers the focal distance information with regard to the plurality of registered camera positions by operating the focus demand 400 in such a way as to determine an angle of view related to each of the objects such that the center of the imaging surface moves to the object. Meanwhile, focal distance information to be registered does not necessarily indicate the focal distance of a subject, which is being focused sharply, in the camera position, and may be a focal distance which is desired to be combined with the camera position.

Subsequently, the CPU 501 acquires a focal distance corresponding to each of the camera positions within the imaging range based on the information of the plurality of registered camera positions and the focal distance information, and completes the 2-dimensional map. A method for acquiring the focal distance of each of the camera positions within the imaging range is the same as a method for acquiring the focal distance of each of the pixel positions on the imaging screen according to the above-described first embodiment.

Figure 6B:
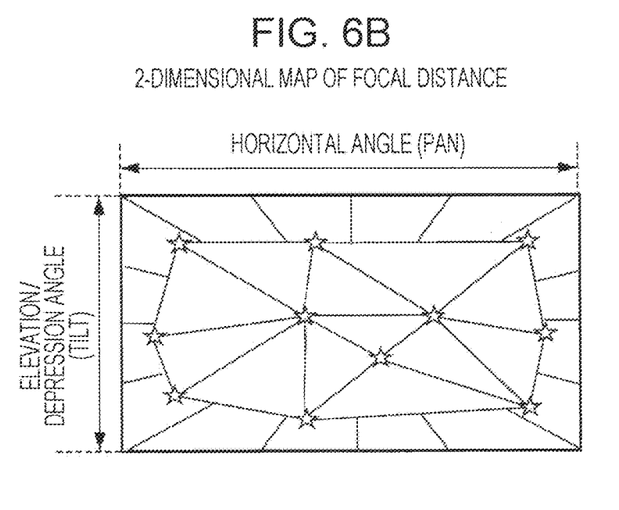

That is, the camera CPU 101 forms a triangular area, in which each of the registered camera positions is an apex, as shown in FIG. 6B. Further, with regard to each of the camera positions within the triangular area, a focal distance is acquired according to a distance from three points based on plane approximation using the triangles. In addition, with regard to each of the camera positions other than the triangular area, a radiation line which passes from the center of the imaging range to the camera position is assumed, and a focal distance of the point of the intersection position of an edge of an outer frame, which crosses the radiation line, is maintained.

The 2-dimensional map of the focal distances, which is generated by the camera CPU 101 of the camera apparatus 100 as described above, is maintained in, for example, a memory 101a included in the camera CPU 101. In the embodiment, the CPU 101 can set the mode to the automatic focus control mode based on the operation of the user operation unit 102 performed by the user. In the case of the automatic focus control mode, the camera CPU 101 acquires the focal distance information corresponding to the camera positions based on the 2-dimensional map of the focal distances, which is maintained in the memory 101a, in accordance with the change in the camera positions performed by a cameraman.

Further, the camera CPU 101 transmits the focal distance information corresponding to the camera positions to the lens CPU 201 of the lens apparatus 200. The lens CPU 201 performs focus control based on the focal distance information which is received as described above. Therefore, the focus state is automatically adjusted to the focus state according to the current camera position.

Meanwhile, in an actual operation, there are many cases in which it is difficult to determine the focal distance using only the camera positions (camera directions). Therefore, in the embodiment, a mode which enables additional adjustment of the focal distance to be manually performed is mounted. When the mode is the automatic focus control mode and the additional adjustment mode is turned on based on the operation of the user operation unit 102 performed by the user, it is possible to adjust the quantity of addition of the focal distance. In this case, when the focus demand 400 is operated by the user, the focus adjustment signal (demand control value) is transmitted to the camera CPU 101 of the camera apparatus 100 through the lens CPU 201.

The camera CPU 101 performs additional adjustment of focal distances based on the focal distance information corresponding to the camera positions, acquired based on the 2-dimensional map, based on the focus adjustment signal, and transmits the focal distance information, on which the additional adjustment is performed, to the lens CPU 201. Therefore, the user can change a focus state according to, for example, the change in the content of the imaged image from a focus state, which is determined using the 2-dimensional map, by operation the focus demand 400.

Here, as an additional method, a first and a second method, that is, two methods may be considered. The first method is a method of setting the value of the center of a variable range from the focus demand 400 to 0 and adding the amount of deviation from the center to the focal distance from the 2-dimensional map as the quantity of addition. For example, when it is assumed that the focal distance from the 2-dimensional map is an ODmap(x,y) and the quantity of addition by the focus demand 400 is Z, a focal distance L acquired after additional adjustment is performed is expressed in Equation (1) below. In this case, when the position of the focus demand 400 returns to the center, the quantity of addition is 0.

$$L = ODmap(x,y) + Z \quad (1)$$

The second method is a method of, only when a demand control value from the focus demand 400 is changed, adding the amount of change to the focal distance from the 2-dimensional map. In this case, for example, a function which enables the quantity of addition to be canceled, such as a function to decrease the absolute value of the quantity of addition by a constant ratio according to the amount of change in the camera position, is provided. Therefore, in the camera position acquired after change is performed, it is possible to lessen the influence of the quantity of addition in a camera position acquired before change is performed, and thus it is possible to approach the original focus control based on the 2-dimensional map.

For example, when the quantity of addition acquired before the camera position is moved by (x,y) is Z' and the constant ratio is a, the absolute value of the quantity of addition Z acquired after the movement is performed can be acquired using Equation (2) below. Meanwhile, when the right side of Equation (2) is equal to or less than 0, |Z|=0.

$$|Z| = |Z'| - a * \sqrt{(x^{}2 + y^{}2)} \quad (2)$$

When the additional adjustment is turned on as described above, display which indicates the state of the quantity of addition is performed on the view finder 300 based on the control performed by the camera CPU 101 in the embodiment. For example, an ascending arrow mark is displayed when the quantity of addition is a positive value, and a descending arrow mark is displayed when the quantity of addition is a negative value. Further, when the quantity of addition is approximately 0, a circle is displayed. An example in the drawing illustrates a case in which the quantity of addition is a positive value. Meanwhile, it is considered that the display of the additional state is the display of a numerical value or text.

As described above, in the camera system 20 shown in FIG. 4, when the automatic focus control is in an on state, focal distance information corresponding to the camera positions from the 2-dimensional map of the focal distances is acquired, and the focus control is automatically performed based on the focal distance information. Therefore, for example, even when the camera position is changed, it is possible to automatically acquire a focus state corresponding to a camera position acquired after the change is performed, and thus it is possible to reduce the labor of the user for focus adjustment.

3. Modification Example

Meanwhile, in the camera system 20 according to the second embodiment shown in FIG. 4, description in which the absolute value of the quantity of addition is reduced by a constant ratio according to the amount of change in a camera position has been made. Although not described above, it is possible to apply this to the camera system 10 according to the first embodiment shown in FIG. 1. In this case, the absolute value of the quantity of addition is reduced by a constant ratio according to the amount of change in a cut-out position (area).

In addition, the present disclosure can have the following configuration:

(1) A focus control apparatus includes: an information acquisition unit that acquires focal distance information of a predetermined position on a 2-dimensional map using the 2-dimensional map of focal distances; and a focus control unit that performs focus control based on the focal distance information which is acquired by the information acquisition unit.

(2) In the focus control apparatus of (1), the 2-dimensional map of the focal distances includes focal distance information of a plurality of positions on an imaging screen, and the information acquisition unit acquires the focal distance information corresponding to a cut-out position, which is set on the imaging screen, using the 2-dimensional map.

(3) The focus control apparatus of (2) further includes a map generation unit that generates the 2-dimensional map based on the focal distances of the plurality of positions on the imaging screen.

(4) In the focus control apparatus of (1), the 2-dimensional map of the focal distances includes the focal distance information of a plurality of camera positions within an imaging range, and the information acquisition unit acquires the focal distance information corresponding to a current camera position using the 2-dimensional map.

(5) In the focus control apparatus of (4), current camera position information is sent to the information acquisition unit from a potentiometer included in a tripod to which a camera apparatus is fixed.

(6) The focus control apparatus of (4) or (5) further includes a map generation unit that generates the 2-dimensional map based on the focal distances of the plurality of camera positions.

(7) The focus control apparatus of any one of (1) to (6) further includes an additional adjustment unit that performs additional adjustment on the focal distance with regard to the focal distance information which is acquired by the information acquisition unit, and the focus control unit performs the focus control based on the focal distance information which is adjusted by the additional adjustment unit.

(8) The focus control apparatus of (7) further includes an additional quantity control unit that significantly reduces an absolute value of the quantity of addition of the focal distance which is added by the additional adjustment unit as the quantity of movement of the predetermined position on the 2-dimensional map is large.

(9) The focus control apparatus of (7) or (8) further includes a display control unit that displays a state of the quantity of addition which is added by the additional adjustment unit on a view finder.

(10) The focus control apparatus of any one of (1) to (9) further includes a mode setting unit that sets a mode to an automatic focus control mode, and the focus control unit performs the focus control based on the focal distance information, which is acquired by the information acquisition unit, when the mode is set to the automatic focus control mode.

(11) A focus control method includes acquiring focal distance information of a predetermined position on a 2-dimensional map using the 2-dimensional map of focal distances; and causing a focus control unit to perform focus control based on the acquired focal distance information.

It should be understood by those skilled in the art that various modifications, combinations, sub-combinations and alterations may occur depending on design requirements and other factors insofar as they are within the scope of the appended claims or the equivalents thereof.

What is claimed is:

1. A focus control apparatus comprising:
    circuitry configured to
    display an image on an imaging screen;
    accept from a user a selection of a plurality of positions in the image and register the plurality of positions as user-registered positions;
    generate a 2-dimensional map of focal distances for the user-registered positions by selecting one of the user-registered positions based on a proximity to a center of the imaging screen, sequentially ranking the user-registered positions based on a proximity to the selected one of the user-registered positions and to already ranked ones of the user-registered positions to form a sequential ranking and generating areas based on the sequential ranking;
    acquire focal distance information of a predetermined position on the 2-dimensional map of focal distances; and
    perform focus control based on the focal distance information which is acquired.

2. The focus control apparatus according to claim 1, wherein the circuitry is configured to acquire the focal distance information corresponding to a cut-out position, which is set on the imaging screen, using the 2-dimensional map.

3. The focus control apparatus according to claim 1, wherein the 2-dimensional map of the focal distances includes the focal distance information of a plurality of camera positions within an imaging range, and
    wherein the circuitry is configured to acquire the focal distance information corresponding to a current camera position using the 2-dimensional map.

4. The focus control apparatus according to claim 3, wherein current camera position information is sent to the circuitry from a potentiometer included in a tripod to which a camera apparatus is fixed.

5. The focus control apparatus according to claim 3, wherein the circuitry is further configured to generate the 2-dimensional map based on the focal distances of the plurality of camera positions.

6. The focus control apparatus according to claim 1, wherein the circuitry is further configured to
    perform additional adjustment on the focal distance with regard to the focal distance information which is acquired; and
    perform the focus control based on the focal distance information which is adjusted.

7. The focus control apparatus according to claim 6, wherein the circuitry is further configured to reduce an absolute value of a quantity of addition of the focal distance which is added as a quantity of movement of the predetermined position on the 2-dimensional map is large.

8. The focus control apparatus according to claim 6, wherein the circuitry is further configured to display a state of a quantity of addition which is added by the additional adjustment on a view finder.

9. The focus control apparatus according to claim 1, wherein the circuitry is further configured to
    set a mode to an automatic focus control mode; and
    perform the focus control based on the acquired focal distance information when the mode is set to the automatic focus control mode.

10. A focus control method comprising:
    displaying, using circuitry, an image on an imaging screen;
    accepting from a user, using the circuitry, a selection of a plurality of positions in the image and registering the plurality of positions as user-registered positions;
    generating a 2-dimensional map of focal distances from the user-registered positions by selecting one of the user-registered positions based on a proximity to a center of the imaging screen, sequentially ranking the user-registered positions based on a proximity to the selected one of the user-registered positions and to already ranked ones of the user-registered positions to form a sequential ranking, and generating areas based on the sequential ranking;

acquiring, using the circuitry, focal distance information of a predetermined position on the 2-dimensional map of focal distances; and performing, using the circuitry, focus control based on the acquired focal distance information.

* * * * *